(12) United States Patent
Nam et al.

(10) Patent No.: US 12,444,442 B2
(45) Date of Patent: Oct. 14, 2025

(54) STORAGE DEVICE AND STORAGE DEVICE ASSEMBLY USING THE SAME

(71) Applicant: Samsung Electronics Co., Ltd., Suwon-si (KR)

(72) Inventors: Byungwoo Nam, Hwaseong-si (KR); Jooyoung Kim, Hwaseong-si (KR); Jihong Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 360 days.

(21) Appl. No.: 17/958,940

(22) Filed: Oct. 3, 2022

(65) Prior Publication Data

US 2023/0197116 A1 Jun. 22, 2023

(30) Foreign Application Priority Data

Dec. 21, 2021 (KR) .................. 10-2021-0183356

(51) Int. Cl.
*G11C 5/00* (2006.01)
*G11C 5/04* (2006.01)
*G11C 14/00* (2006.01)

(52) U.S. Cl.
CPC ............ *G11C 5/04* (2013.01); *G11C 14/0018* (2013.01)

(58) Field of Classification Search
CPC ... G11C 5/04; G11C 14/0018; G11C 16/0483; G11C 16/30; G11C 5/14; G11C 7/04; Y02D 10/00; G06F 3/0688; G06F 1/183; G06F 1/26; G06F 3/061; G06F 3/0653
See application file for complete search history.

(56) References Cited

U.S. PATENT DOCUMENTS

| | | | |
|---|---|---|---|
| 6,906,943 B2 | 6/2005 | Kang | |
| 7,975,105 B1 | 7/2011 | Sun et al. | |
| 8,055,844 B2 | 11/2011 | Lee et al. | |
| 8,611,097 B2 | 12/2013 | Yin et al. | |
| 11,119,658 B2 | 9/2021 | McGlaughlin | |
| 2009/0164722 A1* | 6/2009 | Lee .................. | G06F 13/387 711/170 |
| 2015/0039813 A1 | 2/2015 | Hsu et al. | |

(Continued)

FOREIGN PATENT DOCUMENTS

| | | |
|---|---|---|
| KR | 1020040048029 A | 6/2004 |
| KR | 1020050013738 A | 2/2005 |
| KR | 1020050028630 A | 3/2005 |

*Primary Examiner* — Uyen Smet
(74) *Attorney, Agent, or Firm* — Muir Patent Law, PLLC

(57) ABSTRACT

A storage device includes a module substrate extending in one direction, a non-volatile memory device mounted on the module substrate, a controller mounted on the module substrate, a first connector disposed at a first end of the module substrate and through which data stored in the non-volatile memory device is input/output, and a power management integrated circuit configured to control supplying of power to the controller and the non-volatile memory device. The controller is configured such that in response to a first level signal received from the first connector, the controller connects the non-volatile memory device to the first connector, and then control, after connecting the non-volatile memory device to the first connector, the power management integrated circuit to cut off supplying of the power to the controller.

20 Claims, 8 Drawing Sheets

(56) References Cited

U.S. PATENT DOCUMENTS

2016/0103478 A1* 4/2016 Nakanishi .............. G11C 5/148
 713/323
2020/0073841 A1* 3/2020 Heyd .................. G06F 13/4282
2020/0335140 A1* 10/2020 Kwon ................. G11C 11/4074

* cited by examiner

STORAGE DEVICE AND STORAGE DEVICE ASSEMBLY USING THE SAME

CROSS-REFERENCE TO RELATED APPLICATION(S)

This application claims benefit of priority to Korean Patent Application No. 10-2021-0183356 filed on Dec. 21, 2021 in the Korean Intellectual Property Office, the disclosure of which is herein incorporated by reference in its entirety.

BACKGROUND

1. Field

The present inventive concept relates to a storage device and a storage device assembly using the same.

2. Description of Related Art

Recently, a storage device such as a solid state drive (SSD) using a memory device has been widely used. Such a storage device has advantages in terms of excellent stability and durability because there are no mechanical driving units, and may also have significantly fast information access speeds and low power consumption. Recently, as electronic circuits have been applied to various types of systems such as automobiles, aircraft, and drones as well as electronic systems such as notebook computers, storage devices are also used in various types of systems.

Such a storage device may include a controller and a non-volatile memory, and may be implemented in a form including a controller chip and a memory chip. However, the storage device has a disadvantage in terms of being difficult to expand a storage space.

SUMMARY

An aspect of the present inventive concept is to provide a storage device capable of expanding a storage space and a storage device assembly using the same.

According to an aspect of the present inventive concept, a storage device includes a module substrate extending in one direction, a non-volatile memory device mounted on the module substrate, a controller mounted on the module substrate, a first connector disposed at a first end of the module substrate and through which data stored in the non-volatile memory device is input/output, and a power management integrated circuit configured to control supplying of power to the controller and the non-volatile memory device. The controller is configured such that in response to a first level signal received from the first connector, the controller connects the non-volatile memory device to the first connector, and then control, after connecting the non-volatile memory device to the first connector, the power management integrated circuit to cut off supplying of the power to the controller.

According to an aspect of the present inventive concept, a storage device includes a module substrate, a non-volatile memory device mounted on the module substrate, a controller mounted on the module substrate, a first connector disposed at a first end of the module substrate, and a second connector disposed at a second end, opposite to the first end, of the module substrate and, in response to coupling the storage device to a first another storage device, outputting a first level signal to a controller of the first another storage device. When the first connector receives a first level signal from a second another storage device, the controller controls the non-volatile memory device to be connected to the first connector, and is, after connecting the non-volatile memory device to the first connector, deactivated.

According to an aspect of the present inventive concept, a storage device assembly includes a first storage device, and a second storage device coupled to the first storage device. The first storage device includes a module substrate having a first surface and a second surface, opposite to the first surface, a non-volatile memory device mounted on the first surface, a controller mounted on the first surface and controlling a non-volatile memory device, a first connector disposed at a first end of the first surface, and a second connector disposed at a second end, opposite to the first end, of the first surface and, in response to coupling the first storage device to the second storage device, outputting a first level signal to the second storage device. The second storage device includes a controller, a first connector coupled to the second connector of the first storage device, and a non-volatile memory device. The controller of the second storage device, in response to the first level signal received from the first connector of the second storage device, controls the non-volatile memory device of the second storage device to be connected to the first connector of the second storage device, and then is deactivated.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present inventive concept will be described with reference to the accompanying drawings.

Figure 1:
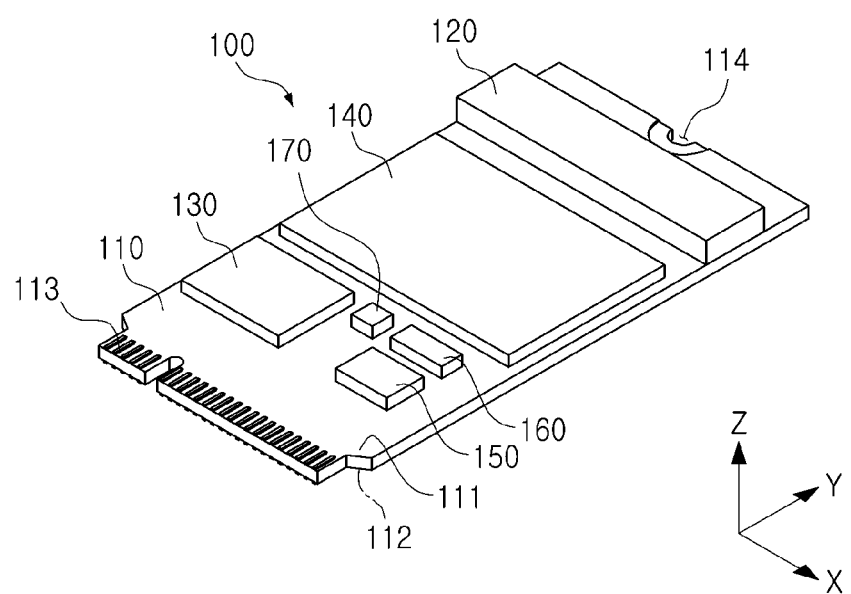
FIG. 1 is a perspective view of a storage device according to an example embodiment of the present inventive concept.
Figure 4:
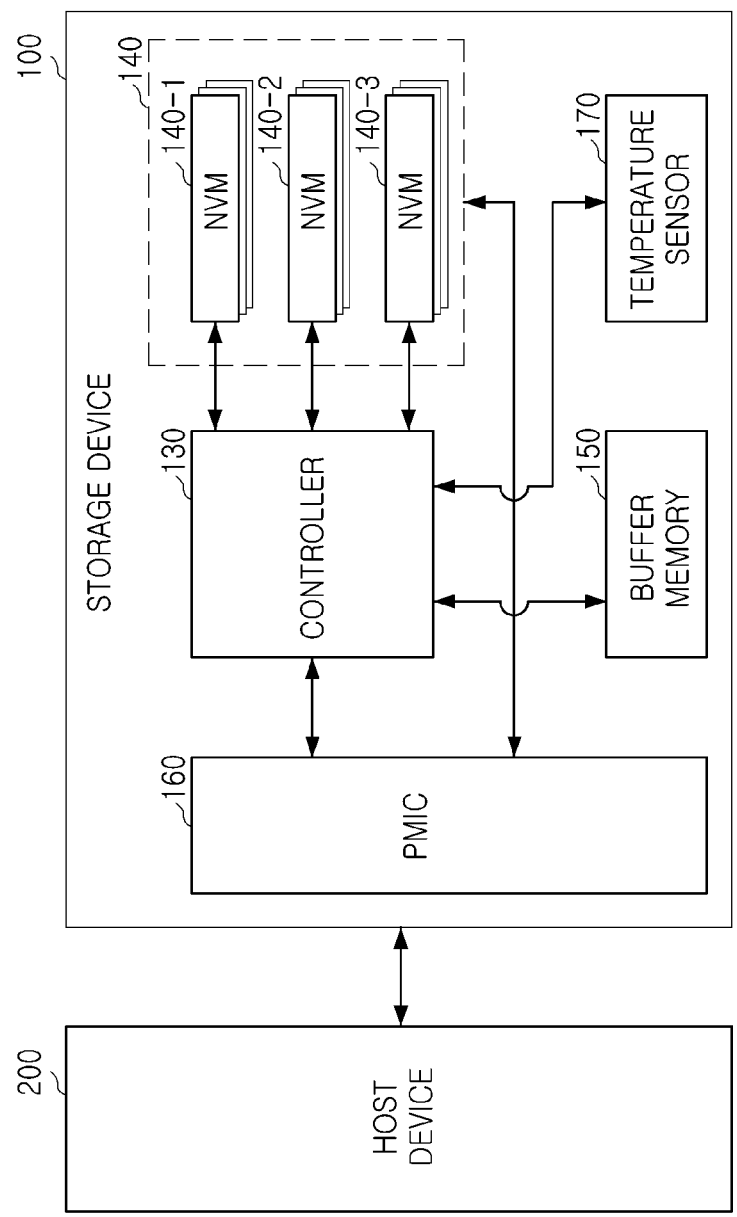
FIG. 4 is a block diagram of the storage device of FIG. 1.

A storage device 100 according to an example embodiment of the present inventive concept will be described with reference to FIGS. 1 and 4. FIG. 1 is a perspective view of a storage device according to an example embodiment of the present inventive concept, and FIG. 4 is a block diagram of the storage device of FIG. 1.

Referring to FIG. 1, a storage device 100 according to an example embodiment may include a module substrate 110, a plurality of electronic components mounted on the module substrate 110, a first connector 113, and a second connector 120. The storage device 100 may operate in response to a request from a host device 200 and may store data accessed by the host device 200.

The host device 200 may control an overall operation of the storage device 100. For example, the host device 200 may include a host processor and a host memory. The host processor may control an operation of the host device 200 and execute, for example, an operating system (OS). The host memory may store instructions and data to be executed and processed by the host processor. For example, an operating system executed by a host processor may include a file system for managing files, and a device driver for controlling peripheral devices including the storage device 100 at an operating system level.

The storage device 100 according to an example embodiment may be a solid state drive (SSD), and may be configured to satisfy a form factor standard such as a 2.5 inch HDD (hard disk), 1.8 inch HDD, 3.5 inch HDD, M.2, mini serial advanced technology attachment (mSATA), and AIC (add-in card). In an example embodiment, a case in which the storage device 100 is configured to satisfy the M.2 form factor standard will be described as an example. As an example, the M.2 form factor standard allows a width of the storage device 100 to be one of 12 mm, 16 mm, 22 mm, and 30 mm, and allows a length of the storage device 100 to be one of 16 mm, 26 mm, 30 mm, 38 mm, 42 mm, 60 mm, 80 mm, and 110 mm.

The module substrate 110 may be a monolayer or multilayer circuit board. For example, the module substrate 110 may be a printed circuit board (PCB). The module substrate 110 may have a first surface 111 and a second surface 112 disposed in a direction, opposite to the first surface 111. The module substrate 110 may include interconnections formed at a surface or in the inside of the module substrate 10 and vias for connecting the interconnections with each other. The module substrate 110 may have an elongated shape in one direction. A first connector 113 may be disposed at one side of the first surface 111 of the module substrate 110, and a second connector 120 may be disposed at the other side thereof. However, the present inventive concept is not limited thereto, and the first connector 113 and the second connector 120 may be respectively disposed at the first surface 111 and the second surface 112 of the module substrate 110. A groove portion 114 for fixing the storage device 100 by using a fixing device such as a bolt may be formed on the other side of the module substrate 110.

The first connector 113 and the second connector 120 may be a pair of male and female connectors. For example, the second connector 120 may be a slot receiving a first connector of another storage device. The first connector 113 and the second connector 120 may be, for example, M.2 connectors. For example, multiple storage devices having the M.2 form factor standard may be connected with other using the M.2 connectors to increase storage space for the host device 200.

The first connector 113 may be connected to a second connector provided in the host device 200 or another storage device, and may transmit and receive a signal from the host device 200 or another storage device, or receive power therefrom.

The second connector 120 may be connected to a first connector provided in another storage device, and may transmit and receive a signal, or receive power from another storage device. For example, the second connector 120 according to an example embodiment may be an add-on connector used to connect another storage device. The second connector 120 may be disposed on the module substrate 110 in a direction, opposite to the first connector 113, to connect the storage device 100 to another storage device. For example, pin arrangement of the second connector 120 may be in a reverse order of pin arrangement of the first connector 113. The second connector 120 may include an input pin of a general-purpose input/output interface included in the first connector 113 provided in another storage device and an output pin connected thereto, and a pull-down circuit may be connected to the output pin. In an embodiment, the second connector 120 may further include a first pin corresponding to a pin of a first connector of another storage device. The pin of the first connector of another storage device may be connected to a general-purpose input/output interface provided in another storage device. When the storage device 100 is connected to another storage device, the first pin of the second connector 120 provided in the storage device 100 is connected to the pin of the first connector of another storage device, and the general-purpose input/output interface of another storage device may receive an output signal of the pull-down circuit. The output signal may serve as a connection signal, which will be described later, for the general-purpose input/output interface of another storage device.

A configuration in which the storage device 100 is coupled to another storage device will be described later.

The plurality of electronic components mounted on the module substrate 110 may include a non-volatile memory device 140, a buffer memory 150, a controller 130, and a temperature sensor 170.

The non-volatile memory device 140 may include a plurality of non-volatile memories 140-1, 140-2, and 140-3. The plurality of non-volatile memories 140-1, 140-2, and 140-3 may store a plurality of data. For example, the plurality of non-volatile memories 140-1, 140-2, and 140-3 may store metadata and other user data. In an example embodiment, each of the plurality of non-volatile memories 140-1, 140-2, and 140-3 may include a NAND flash memory. In an example embodiment, each of the plurality of non-volatile memories 140-1, 1'40-2 and, 140-3 may include a NAND flash memory. In an example embodiment, each of the plurality of non-volatile memories 140-1, 140-2, and 140-3 may include electrically erasable programmable read-only memory (EEPROM), phase change random access memory (PRAM), resistance random access memory (RRAM), nano floating gate memory (NFGM), polymer random access memory (PoRAM), magnetic random access memory (MRAM), ferroelectric random access memory (FRAM), or a memory similar thereto.

The buffer memory 150 may store commands and data to be executed and processed by the controller 130, and may temporarily store data stored in or to be stored in the plurality of non-volatile memories 140-1, 140-2, and 140-3. For example, the buffer memory 330 may include a volatile memory such as dynamic random access memory (DRAM).

Figure 6:
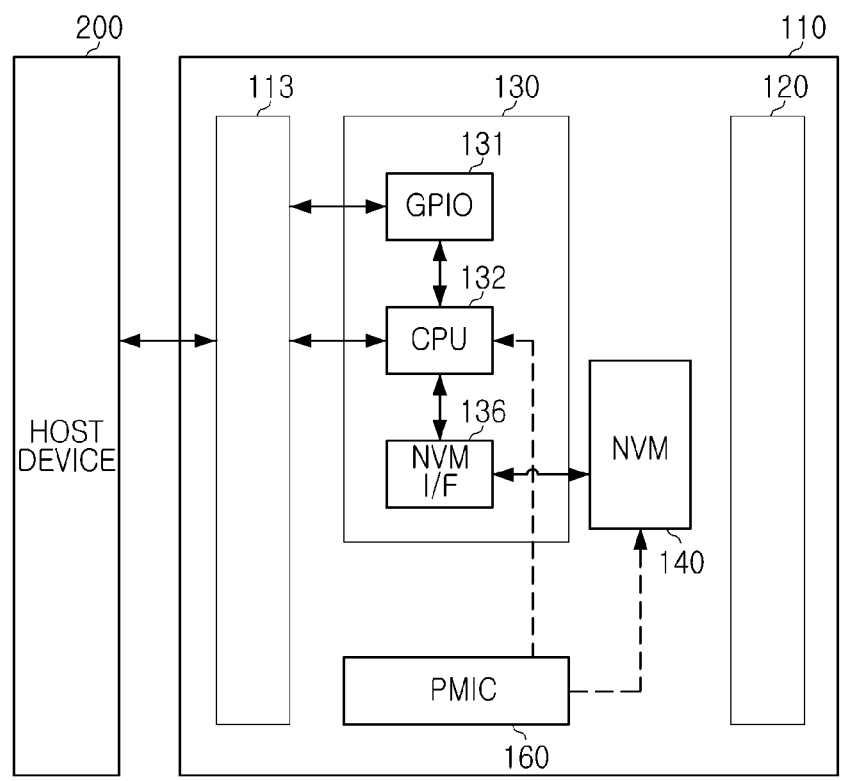
FIG. 6 is a block diagram illustrating that the storage device of FIG. 1 is coupled to a host device.

Referring to FIGS. 4 and 6, the power management integrated circuit 160 may generate and control a power signal supplied to the controller 130, the non-volatile memory device 140, and the buffer memory 150. For example, power for driving the controller 130, the non-volatile memory device 140, and the buffer memory 330 may be controlled and adjusted by the power management integrated circuit 160.

The temperature sensor 360 may sense an operating temperature of the storage device 100. The sensed operating temperature value may be transmitted to the controller 130, and used to perform a dynamic throttling operation or to determine whether product abnormality has occurred. For example, the temperature sensor 170 may be formed separately from the controller 130, the non-volatile memory device 140, the buffer memory 150, and the power management integrated circuit 160, to be mounted on the module substrate 110. In an, the temperature sensor 170 may be included in at least one of the controller 130, the non-volatile memory device 140, the buffer memory 150, and the power management integrated circuit 160, and may be implemented in a form of an on-chip sensor (or an on-die sensor) including an on-chip metal resistor.

Figure 5:
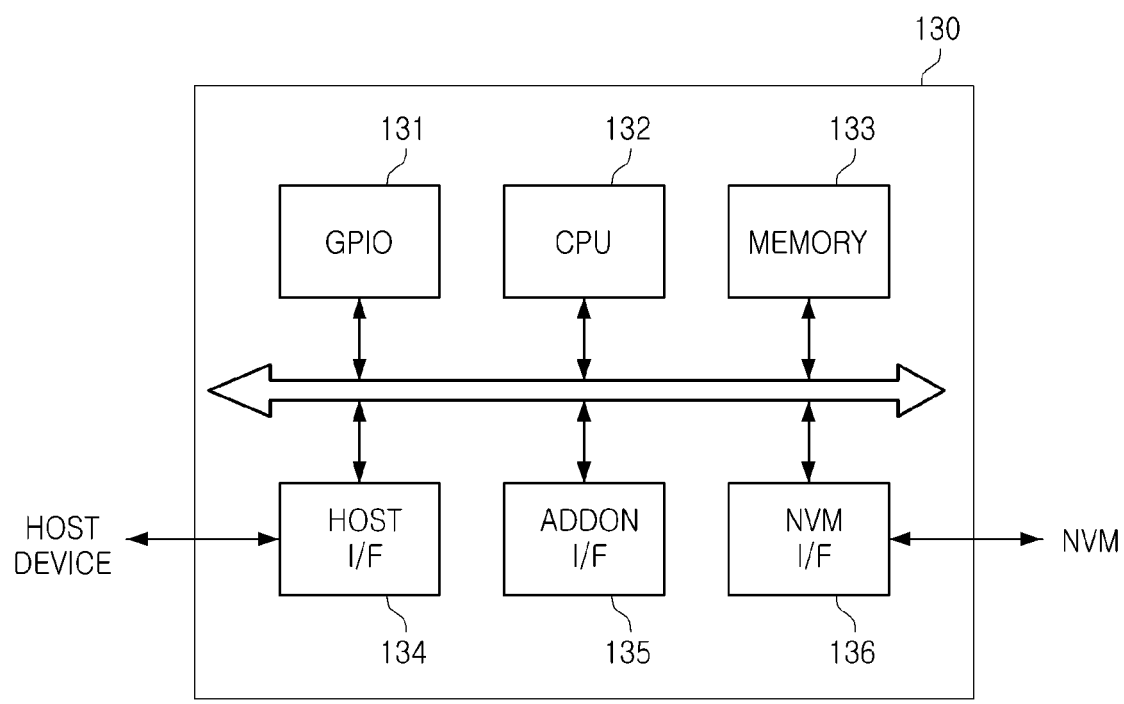
FIG. 5 is a block diagram of the controller of FIG. 4.

Referring to FIG. 5, the controller 130 may include a general-purpose input/output interface (GPIO) 131, a central processing unit (CPU) 132, a memory 133, a host interface (HOST I/F) 134, an add-on interface (ADDON I/F) 135 and a non-volatile memory interface (NVM I/F) 136.

The general-purpose input/output interface 131 may provide an interface for direct communication with the controller 130. In particular, the general-purpose input/output interface 131 according to an example embodiment may be used for receiving a connection signal provided from the host device 200 or another storage device. The general-purpose input/output interface 131 may transmit the received connection signal to the central processing unit 132. For example, when a high level signal is input to the general-purpose input/output interface 131, the central processing unit 132 may control the storage device 100 to operate in a default mode. To this end, the host device 200 may be configured to input a high level signal to the general-purpose input/output interface 131. When a low level signal is input to the general-purpose input/output interface 131, the central processing unit 132 may control the storage device 100 to operate in an add-on mode.

The central processing unit 132 may include a processing unit such as a micro-processor. The central processing unit 132 may control an operation of the controller 130 in response to a command received from the host device (200 of FIG. 4). For example, the central processing unit 132 may control respective configurations by employing firmware for driving the storage device 100.

The memory 133 may store instructions and data to be executed and processed by the central processing unit 132. For example, the memory 133 may be implemented as a volatile memory having a relatively low capacity and high speed, such as a static random access memory (SRAM) or a cache memory.

The host interface 134 may provide a physical connection between the host device 200 and the storage device 100. The host interface 134 may provide interfacing with the storage device 100 in response to a bus format of the host device 200. In an example embodiment, the bus format of the host device 200 may be NVMe. In an example embodiment, the bus format of the host device 200 may be SCSI, SAS, USB, peripheral component interconnect express (PCIe), ATA, PATA, SATA, NVMe, or the like.

The add-on interface 135 may provide a physical connection with a further storage device. That is, the add-on interface 135 may provide interfacing with the storage device 100 in response to a bus format of another storage device. In an example embodiment, the bus format of the further storage device 100 may be NVMe. In an example embodiment, the bus format of the host device 200 may be SCSI, SAS, USB, peripheral component interconnect express (PCIe), ATA, PATA, SATA, NVMe, or the like.

The non-volatile memory interface 136 may exchange data with the plurality of non-volatile memories 140-1, 140-2, and 140-3. For example, the non-volatile memory interface 136 may include a multiplexer. The non-volatile memory interface 136 may transmit data to the plurality of non-volatile memories 140-1, 140-2, and 140-3, and may receive data read from the plurality of non-volatile memories 140-1, 140-2, and 140-3. In an example embodiment, the non-volatile memory interface 136 may be connected to the plurality of non-volatile memories 140-1, 140-2, and 140-3 through one channel. In an example embodiment, the non-volatile memory interface 136 may be connected to the plurality of non-volatile memories 140-1, 140-2, and 140-3 through two or more channels.

Another storage device may be coupled to the storage device according to an example embodiment to expand a storage space of the storage device 100. A configuration in which another storage device is coupled to the storage device will be described with reference to FIGS. 2, 3 and 7.

Figure 2:
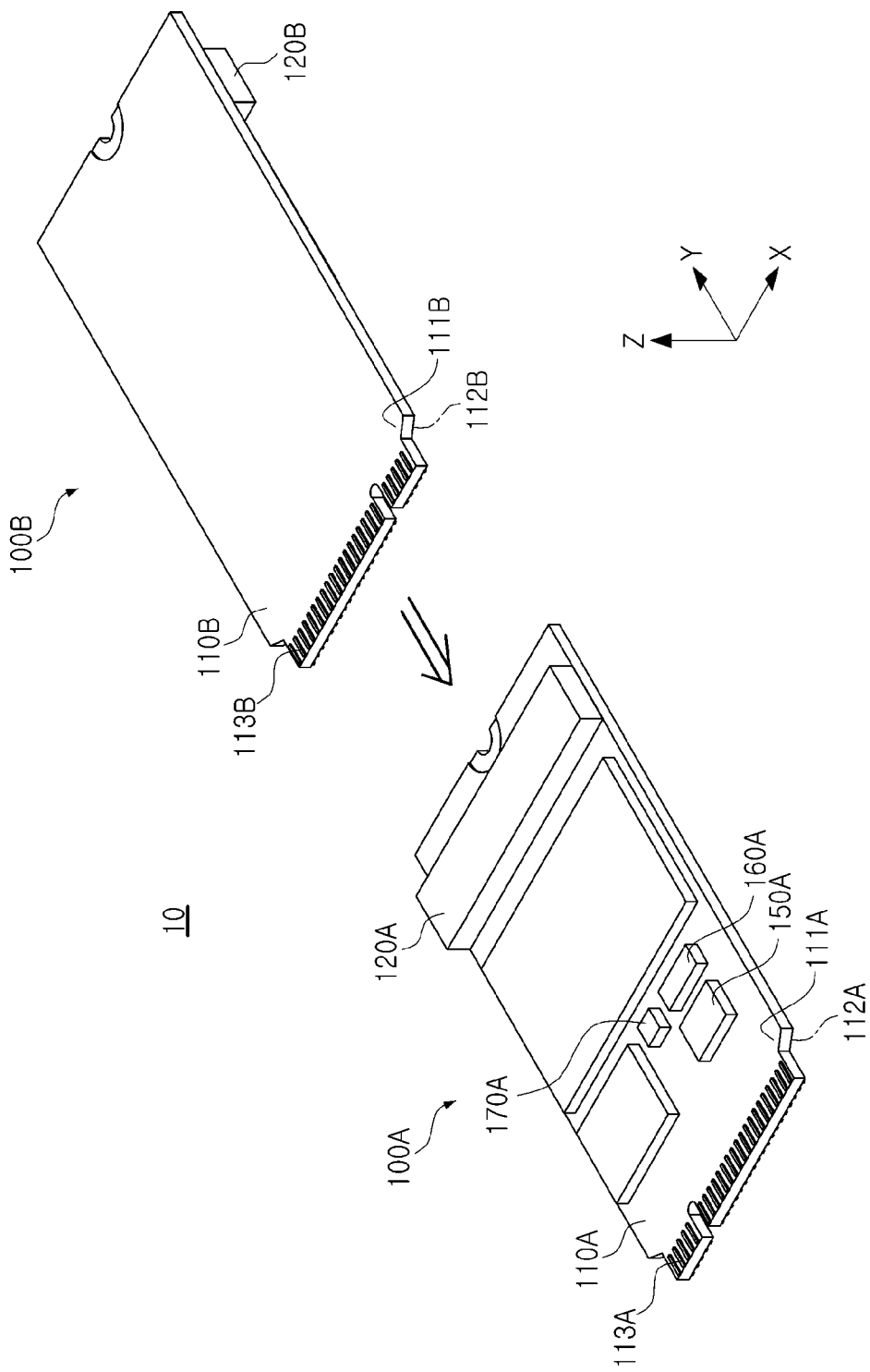
FIG. 2 is a perspective view illustrating a process in which another storage device is added and coupled to the storage device of FIG. 1.
Figure 3:
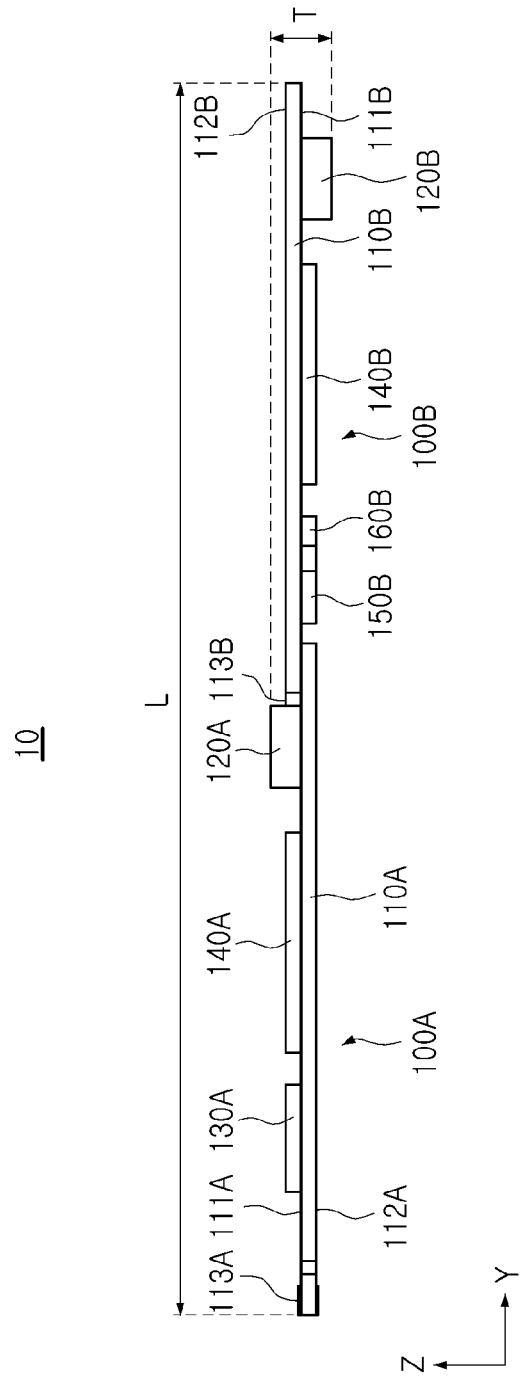
FIG. 3 is a side view illustrating two storage devices coupled.
Figure 7:
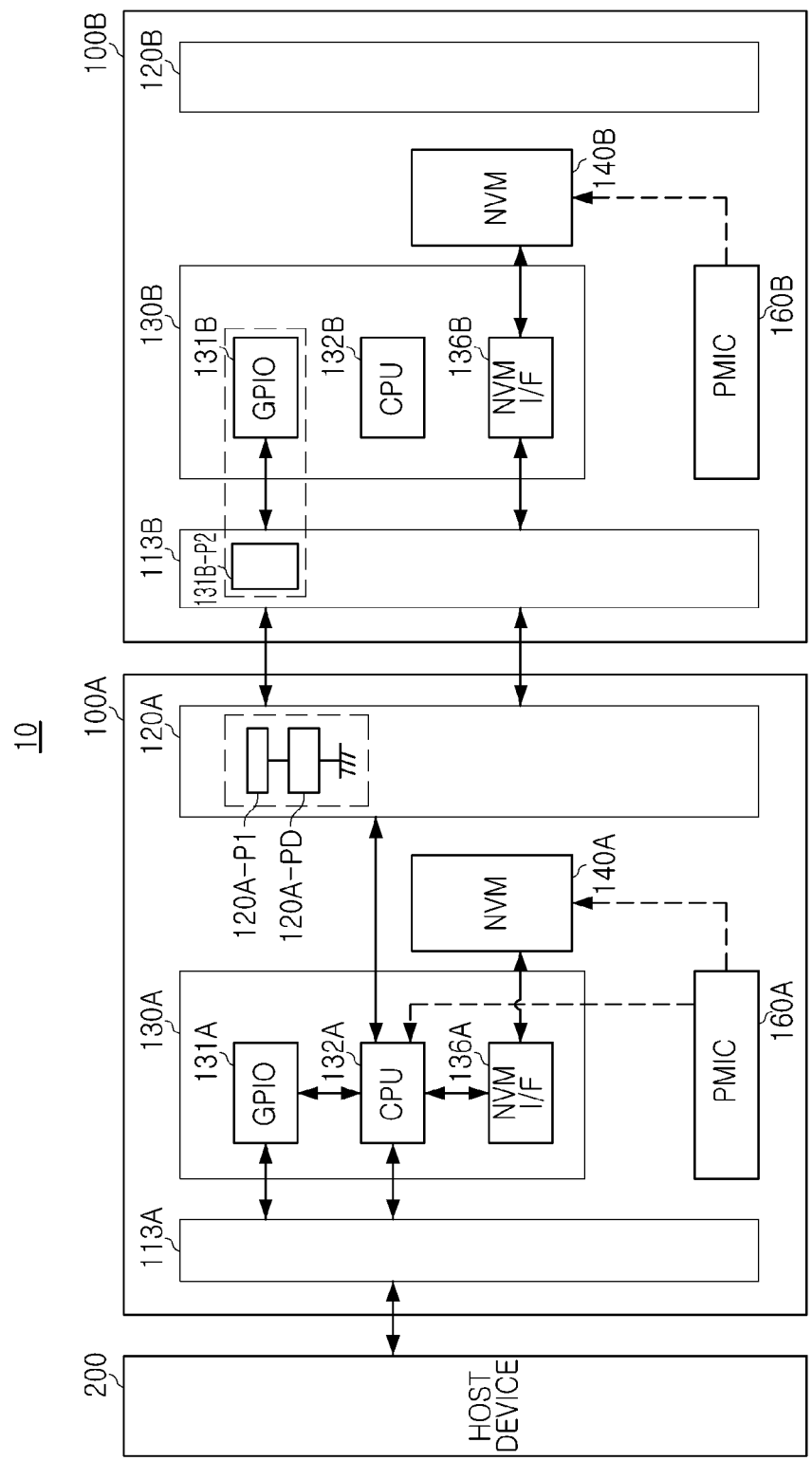
FIG. 7 is a block diagram of a storage device assembly in which another storage device is coupled to the storage device of FIG. 6.

FIG. 2 is a perspective view illustrating a process in which another storage device is added to the storage device of FIG. 1, and FIG. 3 is a side view illustrating that two storage devices are coupled. FIG. 7 is a block diagram of a storage device assembly in which another storage device is coupled to a storage device.

Referring to FIG. 2, in the storage device assembly 10 according to an example embodiment, two storage devices 100 may be coupled with each other. However, the present inventive concept is not limited thereto, and three or more storage devices may be coupled with each other. Hereinafter, a storage device 100 providing a second connector 120 to which a storage device 100 is coupled among storage device assemblies 10 is defined as a first storage device 100A, and a storage device coupled to the first storage device 100A is defined as a second storage device 100B. The first storage device 100A may be understood as a main storage device, and the second storage device 100B may be understood as a sub-storage expanding a storage space of the main storage device. The first storage device 100A and the second storage device 100B may have substantially the same configuration as each other, and may be understood as a relative concept determined by a connected object, respectively.

As illustrated in FIG. 2, a first connector 113B of the second storage device 100B may be connected to a second connector 120A of the first storage device 100A, thereby forming one storage device assembly 10. The second storage device 100B may be coupled such that a first surface 111B and a second surface 112B of the module substrate 110B face in opposite directions from a first surface 111A and the second surface 112B of the module substrate 110A of the first storage device 100A. Accordingly, in the second storage device 100B, compared to a case in which the first surface 111B and the second surface 112B of the module substrate 110B are coupled to the first surface 111A and the second surface 112A of the module substrate 110A of the first storage device 100A to face in the same direction as each other, a thickness T of the storage device assembly 10 may be reduced or may not increase due to coupling (see FIG. 3). A length L of the storage device assembly 10 may be one of 16 mm, 26 mm, 30 mm, 38 mm, 42 mm, 60 mm, 80 mm, and 110 mm allowed by the M.2 form factor standard.

Figure 8:
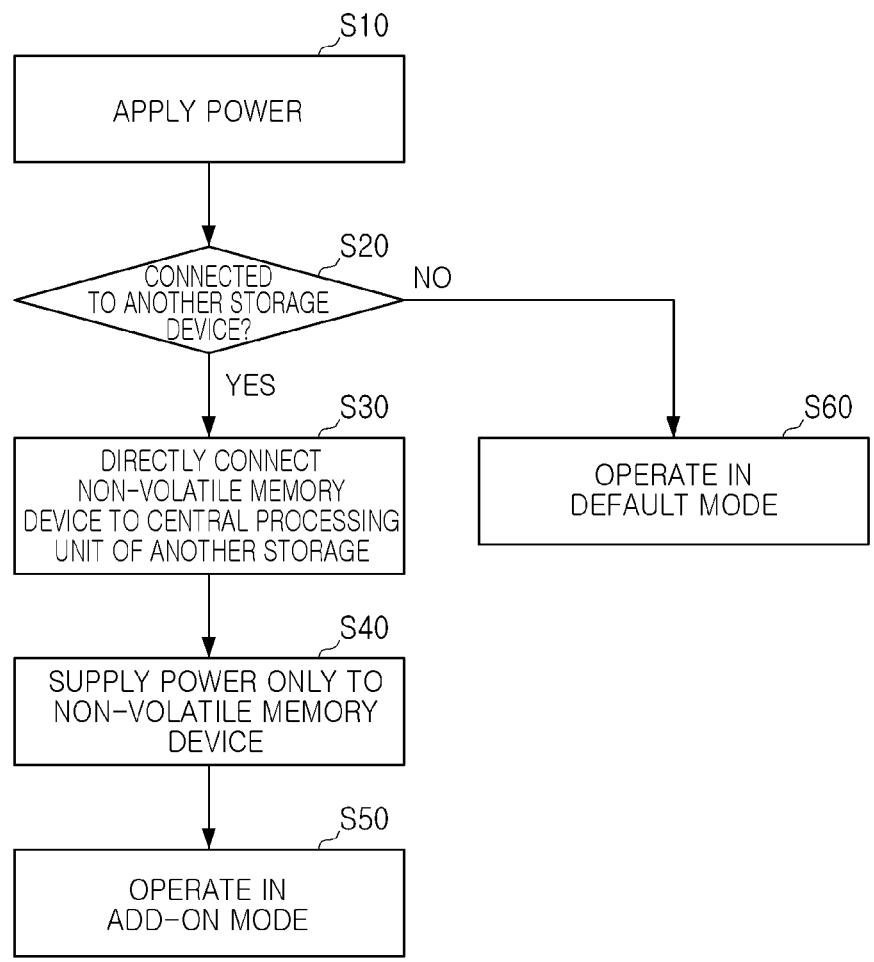
FIG. 8 is a flowchart schematically illustrating an operation of the storage device of FIG. 1.

A process of increasing a storage space of the first storage device 100A by coupling the second storage device 100B to the first storage device 100A will be described with reference to FIGS. 7 and 8. Since an operation of the first storage device 100A is the same as that of the storage device 100 of FIG. 1, a detailed description thereof will be omitted to prevent repetition of the description.

When the first storage device 100A is coupled to a host device 200 in a state in which the second storage device 100B is coupled to the first storage device 100A, power may be applied to the general-purpose input/output interface 131B of the second storage device 100B through a first connector 113B (S10). The central processing unit 132B of the second storage device 100B may be turned on by the applied power through the first storage device 100A.

The central processing unit 132B of the second storage device 100B may determine whether the second storage device 100B is coupled to the host device 200 or the first storage device 100A (S20). Based on a signal input to the general-purpose input/output interface 131B, the central processing unit 132B of the second storage device 100B may determine whether the second storage device 100B is coupled to the host device 200 or the first storage device 100A.

For example, when a low level signal is input to the general-purpose input/output interface 131B in the second storage device 100B, the central processing unit 132B of the second storage device 100B may identify that the second storage device 100B is coupled to the first storage device 100A, and perform an operation of S30. When the second storage device 100B is coupled to the first storage device 100A, the general-purpose input/output interface 131B of the second storage device 100B may be connected to a second connector 120A of the first storage device 100A through a first connector 113B. Due to a pull-down circuit provided in the second connector 120A of the first storage device 100A, a low level signal may be input to the general-purpose input/output interface 131B of the second storage device 100B. In an embodiment, the second connector 120A of the first storage device 100A may include a first pin 120A-P1 and a pull-down circuit 120A-PD, and the first connector 113B of the second storage device 100B may include a second pin 113B-P2 connected to general-purpose input/output interface 131B of the second storage device 100B. The pull-down circuit 120A-PD may supply the low level signal (e.g., a ground level) as a connection signal to the second pin 113B-P2 of the second storage device 110B. When the first storage device 100A is coupled to the second storage device 100B, the first pin 120A-P1 and the second pin 113B-P2 are connected with each other, and the general-purpose input/output interface 131B of the second storage device 100B may receive the connection signal of the pull-down circuit 120A-PD via the first pin 120A-P1 and the second pin 113B-P2 connected with each other.

When it is determined that the second storage device 100B is connected to the first storage device 100A, a central processing unit 132B of the second storage device 100B may control a non-volatile memory interface 136B, to directly connect a non-volatile memory device 140B to the central processing unit 132A of the first storage device 100A (S30).

Next, the central processing unit 132B of the second storage device 100B may control a power management integrated circuit 160B, to maintain only power applied to the non-volatile memory device 140B, and cut off power supplied to the central processing unit 132B (S40). The central processing unit 132B of the second storage device 100B may be deactivated by controlling the power management integrated circuit 160B. For example, the central processing unit 132B of the second storage device 100B may be turned-off, and the second storage device 100B may operate in an add-on mode in which the non-volatile memory device 140B of the second storage device 100B is connected to the central processing unit 132A of the first storage device 100A (S50). Accordingly, when the non-volatile memory device 140B of the second storage device 100B is connected to the central processing unit 132A of the first storage device 100A, the central processing unit 132A of the first storage device 100A may control the non-volatile memory device 140B of the second storage device 100B as a storage space added to the non-volatile memory device 140A.

On the other hand, when a signal is input to the general-purpose input/output interface 131B in the second storage device 100B, the central processing unit 132B may identify that the second storage device 100B is coupled to the first storage device 100A. When the signal is a high level signal, an operation of S60 may be performed in a default mode (S60).

As set forth above, according to the present inventive concept, a storage device and a storage device assembly may expand a storage space by combining an additional storage device with the storage device.

Herein, a lower side, a lower portion, a lower surface, and the like, are used to refer to a direction toward a mounting surface of the fan-out semiconductor package in relation to cross-sections of the drawings, while an upper side, an upper portion, an upper surface, and the like, are used to refer to an opposite direction to the direction. However, these directions are defined for convenience of explanation, and the claims are not particularly limited by the directions defined as described above.

The meaning of a "connection" of a component to another component in the description includes an indirect connection through an adhesive layer as well as a direct connection between two components. In addition, "electrically connected" conceptually includes a physical connection and a physical disconnection. It can be understood that when an element is referred to with terms such as "first" and "second", the element is not limited thereby. They may be used only for a purpose of distinguishing the element from the other elements, and may not limit the sequence or importance of the elements. In some cases, a first element may be referred to as a second element without departing from the scope of the claims set forth herein. Similarly, a second element may also be referred to as a first element.

The term "an example embodiment" used herein does not refer to the same example embodiment, and is provided to emphasize a particular feature or characteristic different from that of another example embodiment. However, example embodiments provided herein are considered to be able to be implemented by being combined in whole or in part one with one another. For example, one element described in a particular example embodiment, even if it is not described in another example embodiment, may be understood as a description related to another example embodiment, unless an opposite or contradictory description is provided therein.

Terms used herein are used only in order to describe an example embodiment rather than limiting the present disclosure. In this case, singular forms include plural forms unless interpreted otherwise in context.

The various and advantageous advantages and effects of the present inventive concept are not limited to the above description, and may be more easily understood in the course of describing the specific embodiments of the present inventive concept.

While example embodiments have been shown and described above, it will be apparent to those skilled in the art that modifications and variations could be made without departing from the scope of the present inventive concept as defined by the appended claims.

What is claimed is:

1. A storage device, comprising:
a module substrate extending in one direction;
a non-volatile memory device mounted on the module substrate;
a controller mounted on the module substrate;
a first connector disposed at a first end of the module substrate and through which data stored in the non-volatile memory device is input/output; and
a power management integrated circuit configured to control supplying of power to the controller and the non-volatile memory device,
wherein the controller is configured such that in response to a first level signal received from the first connector, the controller connects the non-volatile memory device to the first connector, and then control, after connecting the non-volatile memory device to the first connector, the power management integrated circuit to cut off the supplying of the power to the controller, and
wherein a voltage level of the first level signal is a fixed voltage level.

2. The storage device of claim 1,
wherein the controller comprises:
a central processing unit;
a general-purpose input/output interface controlling, in response to the first level signal, connection between the first connector and the central processing unit; and
a non-volatile memory interface for controlling the non-volatile memory device according to a control of the central processing unit, and
wherein the power management integrated circuit is configured to control the supplying of the power to the central processing unit.

3. The storage device of claim 2, further comprising:
a second connector disposed at a second end of the module substrate and, in response to coupling of another storage device to the storage device, outputting a first level signal to a controller of the another storage device.

4. The storage device of claim 2,
wherein, when the first level signal is detected from the first connector, the central processing unit controls the non-volatile memory interface to directly connects the non-volatile memory device to the first connector.

5. The storage device of claim 4,
wherein the central processing unit controls, after connecting the non-volatile memory device to the first connector, the power management integrated circuit to cut off the supplying of the power to the central processing unit.

6. The storage device of claim 2,
wherein the central processing unit is configured to control, in response to a second level signal via the first connector from a host device, the non-volatile memory interface to input/output data stored in the non-volatile memory device directly to the host device via the first connector.

7. The storage device of claim 6,
wherein the first level signal is a low level signal, and
wherein the second level signal is a high level signal.

8. The storage device of claim 1, further comprising:
a temperature sensor mounted on the module substrate and sensing a temperature of the storage device.

9. A storage device, comprising:
a module substrate;
a non-volatile memory device mounted on the module substrate;
a controller mounted on the module substrate;
a first connector disposed at a first end of the module substrate; and
a second connector disposed at a second end, opposite to the first end, of the module substrate and, in response to coupling the storage device to a first another storage device, outputting a first level signal to a controller of the first another storage device,
wherein, when the first connector receives a first level signal from a second another storage device,
wherein the controller is configured to:
determine, in response to the first level signal from the second another storage device, that the storage device is coupled to the second another storage device; and
controls, in response to the first level signal from the second another storage device being determined as the storage device being coupled to the second another storage device, the non-volatile memory device to be connected to the first connector, and
wherein the controller is, after connecting the non-volatile memory device to the first connector, deactivated.

10. The storage device of claim 9, further comprising:
a power management integrated circuit configured to control supplying of power to the controller and the non-volatile memory device,
wherein the controller is configured further to controls, in response to the first level signal from the second another storage device, the power management integrated circuit to cut off the supplying of the power to the controller.

11. The storage device of claim 10,
wherein the controller comprises:
a central processing unit;
a general-purpose input/output interface controlling, in response to the first level signal, connection between the first connector and the central processing unit; and
a non-volatile memory interface controlling the non-volatile memory device according to a control of the central processing unit, and
wherein the power management integrated circuit is configured to control the supplying of the power to the central processing unit.

12. The storage device of claim 9,
wherein the second connector is a slot into which a first connector of the first another storage device is inserted.

13. The storage device of claim 9,
wherein pin arrangement of the second connector is in a reverse order of pin arrangement of the first connector.

14. The storage device of claim 9,
wherein data stored in the non-volatile memory device are input/output via the first connector.

15. A storage device assembly, comprising:
a first storage device; and
a second storage device coupled to the first storage device,
wherein the first storage device includes:
a module substrate having a first surface and a second surface, opposite to the first surface;
a non-volatile memory device mounted on the first surface;
a controller mounted on the first surface and controlling the non-volatile memory device;
a first connector disposed at a first end of the first surface; and a second connector disposed at a second end, opposite to the first end, of the first surface and including a first pin and a pull-down circuit outputting, in response to coupling the first storage device to the second storage device, a first level signal to the second storage device via the first pin, wherein the second storage device includes:

a controller;

a first connector coupled to the second connector of the first storage device and including a second pin coupled to the first pin; and a non-volatile memory device, and wherein the controller of the second storage device, in response to the first level signal received from the pull-down circuit of the first connector of the second storage device, controls the non-volatile memory device of the second storage device to be connected to the first connector of the second storage device, and then is deactivated.

16. The storage device assembly of claim 15, wherein the controller of the second storage device is configured to detect the first level signal output from the second connector of the first storage device.

17. The storage device assembly of claim 15, wherein the first and second connectors are M.2 connectors.

18. The storage device assembly of claim 15, wherein the first surface of the module substrate of the first storage device is disposed in a direction, opposite to a first surface of a module substrate of the second storage device.

19. The storage device assembly of claim 15, wherein the non-volatile memory device in each of the first storage device and the second storage device is a NAND flash memory.

20. The storage device assembly of claim 15, wherein the first and second storage devices are the same as each other.

* * * * *